Patented June 24, 1930

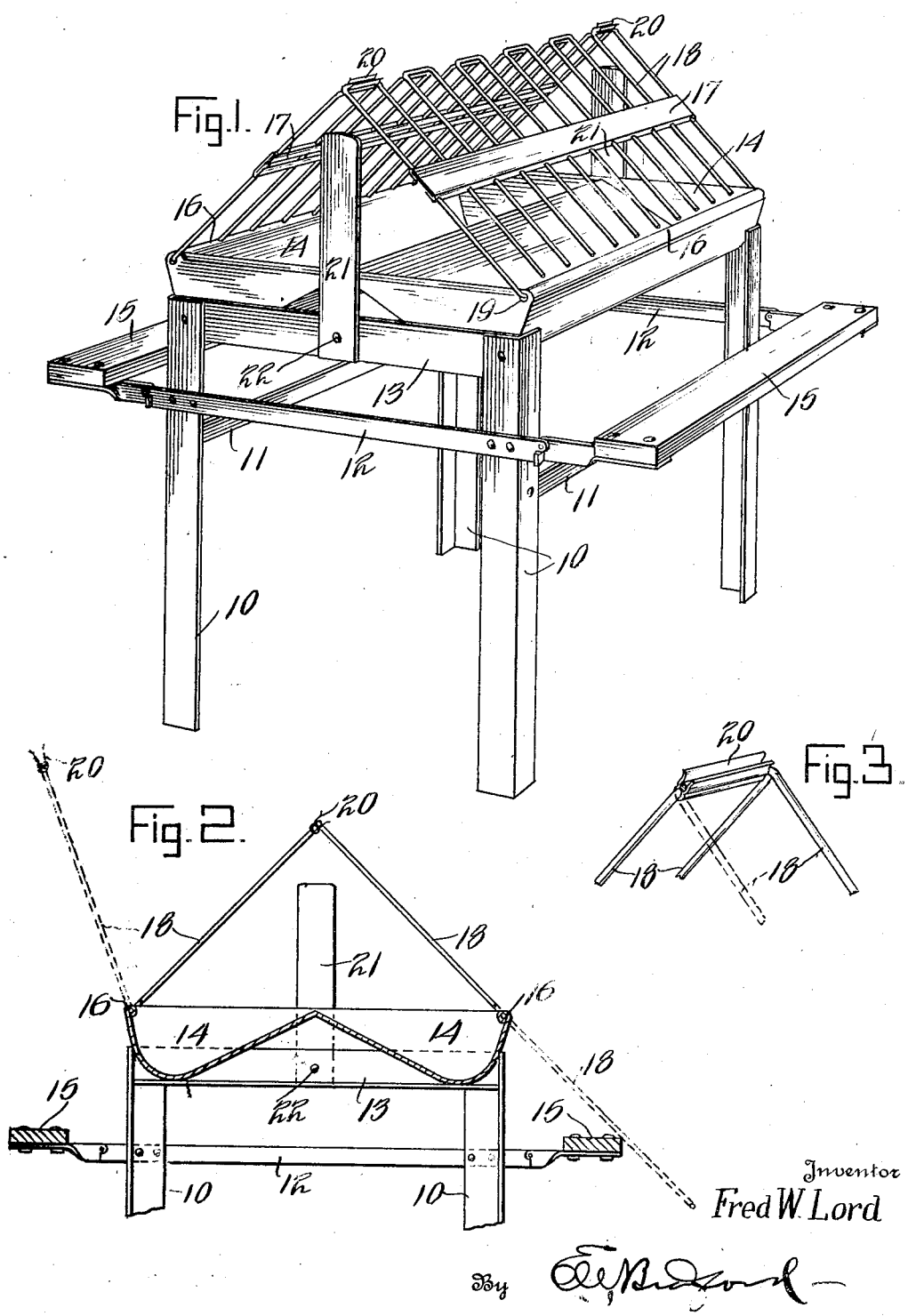

1,768,090

UNITED STATES PATENT OFFICE

FRED W. LORD, OF TIPTON, INDIANA, ASSIGNOR TO THE OAKES MANUFACTURING COMPANY, OF TIPTON, INDIANA, A CORPORATION OF INDIANA

POULTRY FEEDER

Application filed May 20, 1926. Serial No. 110,516.

My said invention relates to poultry feeders and it is an object of the invention to provide a feeder of neat and attractive appearance, of light weight and of simple but durable construction; all as will be hereinafter more fully described and claimed.

Referring to the accompanying drawings, which are made a part hereof and on which similar reference characters indicate similar parts, Figure 1 is a perspective of a feeder constructed in accordance with my invention, Figure 2, a detail fragmentary section, and Figure 3, a detail view illustrating the manner of fastening the guards together.

Reference character 10 indicates the legs of the frame of a poultry feeder constructed in accordance with my invention, said frame being provided with braces 11 and 12 and cross members 13 for supporting troughs or receptacles 14 for green, dry or other feeds.

Perches 15 are pivotally mounted at each side of the frame on the ends of the braces 12 in a position to support the fowls so they may eat from the troughs 14 and said supports are swingable to a substantially vertical position to prevent fowls from roosting thereon. Said perches 15 are preferably of wood although I preferably construct the remainder of the feeder of metal and in order to prevent injury to the fowls I roll over the outer edges 16 of the troughs.

Various devices have been provided for preventing the fowls from getting into the troughs and scratching out the feed, however certain of these devices have proved very unsatisfactory. I have therefore devised means for keeping the fowls out of the feed troughs which at the same time does not interfere in the least degree with the feeding of the fowls. This structure comprises a pair of wire guards or frames pivoted to the troughs, one at each side of the feeder, and said wire frames rest each against the other at their upper ends. Each wire guard is formed of a central longitudinally disposed support 17 having a plurality of rods or bars 18 secured transversely thereof. Said rods or bars 18 are arranged in pairs in parallel relation and are connected at their upper ends by horizontal cross pieces disposed at right angles to each bar. The end bar at each end of the feeder is bent inwardly in a substantially horizontal plane at its end 19 and said bent portion extends into the roll over rim 16 and serves as a hinge or pivot for the frame. If for any reason it is desirable to remove the guards the inwardly bent ends 19 may flex sufficiently to permit them to be withdrawn from the ends of the rolled over frames 16.

By the foregoing construction the guards may be turned back when access is desired to the interior of the feeder and in order to hold the guards in proper position I provide a resilient clip 20 between the horizontal portions of opposed end pairs of bars, said clips being readily removable. The guards will therefore be held in arched position and the fowls may eat freely from the troughs but are prevented from accidental disarrangement of the guards. The fowls are prevented from entering the ends of the feeder by means of bars 21 pivoted at 22 centrally of the end supports 13. These bars may be turned down out of the way to permit green feed to be inserted through the end of the feeder.

While I have described two wire guards, if desired only one guard may be used, such guard being of a slightly larger size and of a sufficient length to entirely protect the trough and prevent the fowls from getting into the same when the guard is disposed in a substantially horizontal plane.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent is:

1. A poultry feeder comprising a frame, a trough supported in said frame, a pair of wire guards mounted at each side of said trough and connected at their contiguous edges, and a bar pivoted centrally of the ends of the frame and adapted to be disposed normally in upright position but adapted to be turned about its pivot to permit access to said trough, substantially as set forth.

2. A poultry feeder comprising a frame, a pair of troughs supported in said frame, a wire guard pivoted at the outer corners of each trough, and a resilient clasp for fastening together the free ends of the guards substantially as set forth.

3. A poultry feeder comprising a frame, a pair of troughs supported in said frame, a wire guard pivoted at the outer corners of each trough, a resilient clasp for fastening together the free ends of the guards said guards being disposed in arched position when fastened together, and a pivotally mounted member at each end of the feeder for preventing the entry of fowls into the troughs, substantially as set forth.

4. A poultry feeder comprising a frame, a trough supported in said frame, a pair of wire guards each comprising a longitudinally disposed supporting member, and a plurality of U-shaped members carried by said supporting member with the portions joining the sides of the U-shaped members disposed in opposed relation said guards being mounted adjacent each side of the trough with detachable fastening elements connecting contiguous portions of the U-shaped members, substantially as set forth.

5. A poultry feeder comprising a frame, a receptacle supported in said frame, wire guards pivoted one at each side of the receptacle and adapted to extend across the same to prevent fowls from getting into the receptacle said wire guards each comprising a central flat brace, and spaced rods mounted with the side members of said rods disposed substantially in the same plane transversely of said brace, substantially as set forth.

In witness whereof, I have hereunto set my hand and seal at Tipton, Indiana this 30th day of April, A. D. nineteen hundred and twenty-six.

FRED W. LORD.